United States Patent
Oezdeniz et al.

(10) Patent No.: US 9,988,701 B2
(45) Date of Patent: Jun. 5, 2018

(54) METHOD FOR COATING A SUBSTRATE WITH A SPRAY MATERIAL AND FUNCTIONAL LAYER ACHIEVABLE WITH THIS METHOD

(71) Applicant: Daimler AG, Stuttgart (DE)

(72) Inventors: Eyuep Akin Oezdeniz, Walheim am Neckar (DE); Rainer Joos, Kernen (DE); Wolfgang Hansen, Esslingen (DE); Michael Walker, Kusterdingen (DE); Uemit Akay, Goeppingen (DE)

(73) Assignee: Daimler AG, Stuttgart (DE)

( * ) Notice: Subject to any disclaimer, the term of this patent is extended or adjusted under 35 U.S.C. 154(b) by 278 days.

(21) Appl. No.: 14/405,867

(22) PCT Filed: May 28, 2013

(86) PCT No.: PCT/EP2013/001574
§ 371 (c)(1),
(2) Date: Dec. 5, 2014

(87) PCT Pub. No.: WO2014/000849
PCT Pub. Date: Jan. 3, 2014

(65) Prior Publication Data
US 2015/0152539 A1    Jun. 4, 2015

(30) Foreign Application Priority Data
Jun. 29, 2012   (DE) .................. 10 2012 013 020

(51) Int. Cl.
*C23C 4/06* (2016.01)
*C23C 4/10* (2016.01)
(Continued)

(52) U.S. Cl.
CPC ............ *C23C 4/08* (2013.01); *B23K 35/0227* (2013.01); *B23K 35/0261* (2013.01);
(Continued)

(58) Field of Classification Search
None
See application file for complete search history.

(56) References Cited

U.S. PATENT DOCUMENTS

2010/0276038 A1* 11/2010 Grellier .................. C21D 1/22
                                                                148/542
2012/0276038 A1    11/2012 Kido et al.
2013/0089682 A1*  4/2013 Izquierdo ........... B23K 35/3086
                                                                427/580

FOREIGN PATENT DOCUMENTS

CN    101861407 A    10/2010
CN    102086494 A    6/2011
(Continued)

OTHER PUBLICATIONS

Machine-English translation of JP2012-041617, Kiyoshi et al., Mar. 1, 2012.*
Machine-English translation of DE102008034551, Martin et al., Oct. 15, 2009.*
Machine-English translation of DE 102008034547, Martin et al., Feb. 25, 2010.*
International Search Report in International Application No. PCT/EP2013/001574 dated Feb. 3, 2014.
(Continued)

*Primary Examiner* — Deborah Yee
(74) *Attorney, Agent, or Firm* — Stephan A. Pendorf; Patent Central LLC

(57) ABSTRACT

A method for coating a substrate, in which a wire-shaped spray material is melted in an electric arc and is deposited as a functional layer on the substrate. The invention also relates to a functional layer which can be produced on the substrate by this method. The functional layer has a high hardness value and good corrosion resistance on exposure to diesel fuel with a high sulphur proportion.

17 Claims, 1 Drawing Sheet

(51) Int. Cl.
  *B23K 35/22* (2006.01)
  *C22C 38/02* (2006.01)
  *C22C 38/44* (2006.01)
  *C22C 38/48* (2006.01)
  *C22C 38/50* (2006.01)
  *C22C 38/58* (2006.01)
  *C23C 4/08* (2016.01)
  *B23K 35/30* (2006.01)
  *B23K 35/02* (2006.01)
  *B32B 15/01* (2006.01)
  *C22C 38/04* (2006.01)
  *C23C 4/067* (2016.01)
  *C23C 4/131* (2016.01)

(52) U.S. Cl.
  CPC ........ *B23K 35/308* (2013.01); *B23K 35/3086* (2013.01); *B32B 15/01* (2013.01); *C22C 38/02* (2013.01); *C22C 38/04* (2013.01); *C22C 38/44* (2013.01); *C22C 38/48* (2013.01); *C22C 38/50* (2013.01); *C22C 38/58* (2013.01); *C23C 4/06* (2013.01); *C23C 4/067* (2016.01); *C23C 4/131* (2016.01)

(56) References Cited

FOREIGN PATENT DOCUMENTS

| DE | 10308563 B3 | 8/2004 | |
|---|---|---|---|
| DE | 102007010698 A1 | 9/2008 | |
| DE | 102008034551 B3 | 10/2009 | |
| DE | 102008034547 B3 | 2/2010 | |
| DE | 102010021300 A1 * | 11/2011 | ............... C23C 4/06 |
| DE | 102010021300 A1 | 11/2011 | |
| EP | 2664684 A2 | 11/2013 | |
| JP | 2012041617 A | 3/2012 | |

OTHER PUBLICATIONS

English language translation of Chinese Office Action dated Mar. 3, 2015, in Chinese Application No. 201380034644.6.

Japanese Office Action (with English language translation) dated Dec. 8, 2015, in Chinese Application No. 2015-517626.

Chinese Office Action (with English language translation) dated Jul. 11, 2016, in Chinese Application No. 201380034644.6.

* cited by examiner

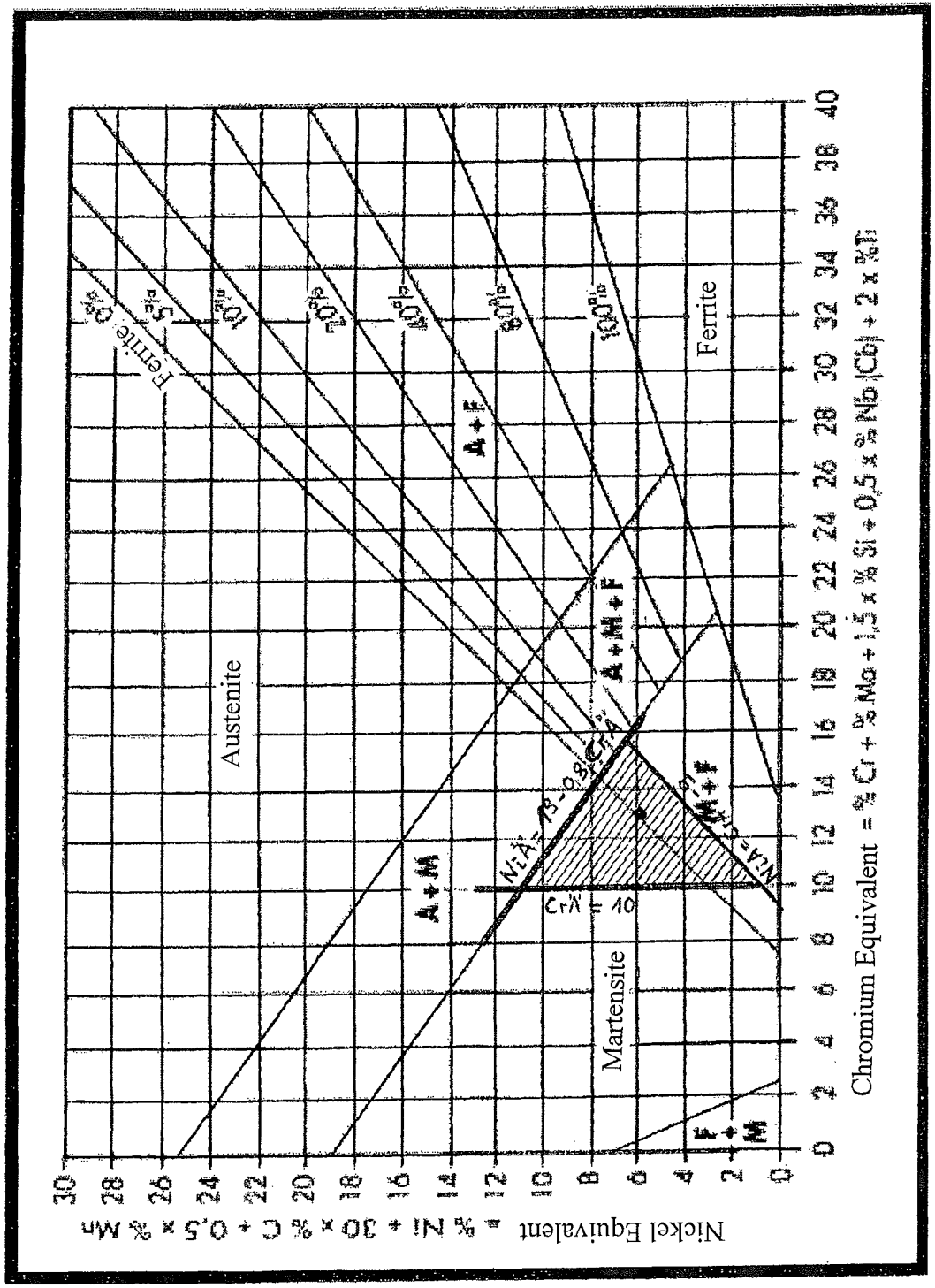

METHOD FOR COATING A SUBSTRATE WITH A SPRAY MATERIAL AND FUNCTIONAL LAYER ACHIEVABLE WITH THIS METHOD

The invention relates to a method for coating a substrate, in which a wire-shaped spray material is melted in an electric arc and is deposited as a layer on the substrate. The invention furthermore relates to a corrosion-resistant functional layer that is able to be generated with this, having sufficiently high hardness and tribologically favourable properties.

During the production of combustion motors, as low a level as possible of friction and high abrasion and wear resistance are aimed for, for reasons of energy efficiency and emission reduction. For this purpose, motor components such as, for example, cylinder bores or the walls thereof are provided with a tread surface layer, or liners are used in the cylinder bores which are provided with a tread surface layer. The application of such tread surface layers occurs mostly by means of thermal spraying, for example electric arc wire spraying. During electric arc wire spraying, an electric arc is generated by applying a voltage between two wire-shaped spray materials. Here, the wire tips melt and are transported to the surface to be coated, for example the cylinder wall, for example by means of an atomising gas, where they accumulate.

A cylinder liner for combustion engines is known from DE 10308563 B3, which has a base body having a wear-resistant coating on the tread surface, based on a hard iron alloy having a martensite formation, wherein the wear-resistant layer is able to be applied in the electric arc wire spraying process and the alloy of the coating, among other things, has a carbon content of 0.05 to 3% by weight and a chrome content of 9 to 13% by weight.

A method for the production of a coating by means of electric arc wire spraying is known from DE 102007010698 A1, in which a chrome-containing iron alloy is supplied with 0.5 to 8% by weight boron carbide. The supply of boron carbide enables the formation of iron boride and thus leads to an increase of the layer hardness. However, this increases the process costs and worsens the machinability.

It is known that commercial layer systems based on low-alloy iron carbon alloys corresponding to cast iron surfaces tend to corrode. This can be countered by the introduction of chrome. On the other hand, chrome-containing layers that have so far been investigated achieve the required hardness only by, for example, additional introduction of carbide particles, such as, for example, boron carbide. This in turn requires a complex supply of powder, independent of the wire feed, by means of powder feed or the use of cost-intensive cored wires. Additionally, the boron carbide proportion acts in a brittle manner, i.e. leads to the increased formation of cracks of layers that are generated in this way, and such layers have a strong abrasive effect compared to tribological partners.

To avoid these disadvantages, the introduction of boron was dispensed with in DE 102010021300 A1 and instead the hardness of the applied functional layer was adjusted by a high carbon proportion of at least 0.7% by weight in the supplied iron alloy.

It has been shown, however, that the thus generated functional layers do not achieve a sufficient level of hardness at least for the coating of tracks of diesel motors and also further tribological requirements cannot be fulfilled to an advantageous extent for diesel motors.

It is therefore an object of the invention to specify an improved method for electric arc wire spraying as well as a functional layer that is able to be produced with this. Target values therein are, as well as good spraying properties, targeted properties of the functional layer, in particular good machinability. The layer properties furthermore contain sufficient corrosion resistance as well as sufficient hardness, which should lie in the range of 400 to 650 HV 0.1. Layers having these properties can be produced without additional feed devices and can contain boron or boron carbide.

The object is solved according to the invention by a functional layer having the features of claim 1 as well as by a method for coating a substrate having a wire-shaped spray material having the features of claim 3. Advantageous developments are subject matter of the sub-claims.

A method according to the invention is characterised by the use of a wire-shaped spray material based on iron, having the following alloy components specified using the indicators of nickel equivalent (NiÄ) and chrome equivalent (CrÄ) of the Schäffler diagramm:

CrÄ>10.5 and
NiÄ>CrÄ−8 and
NiÄ<21−0.8*CrÄ each with respect to total weight.

The Schäffler diagram is a common depiction of indicators which provide information concerning the proportion of alloyed steels in the weld material and is reproduced here as FIG. 1. Here, the alloy components, nickel, carbon and manganese, forming austenite or supplying this, are summarised by so-called nickel equivalents (=NiÄ=Ni proportion [% by weight]+30*C proportion [% by weight]+0.5*Mn proportion [% by weight]) and the alloy components, chrome, molybdenum, silicon, niobium and titanium, forming ferrite or supplying this, are summarised by so-called chrome equivalents (=CrÄ=Cr proportion [% by weight]+Mo proportion [% by weight]+1.5*Si proportion [% by weight]+0.5*Nb proportion [% by weight]+2*Ti proportion [% by weight]) and the proportions of martensite, austenite and ferrite formed depending on the alloy composition are depicted depending thereon.

The desired corrosion resistance of the functional layer to be produced requires at least one chrome equivalent of 10. For this purpose, the Cr proportion must be selected in the spray wire in such a way that enough evaporation occurs during the process. Investigations have shown that the definition of the alloy composition of the spray wire must include evaporation of up to 0.5% by weight of chrome in the wire. Thus a minimum chrome equivalent of 10.5 results for the spray wire.

The functional layer to be produced has, on the one hand, sufficient hardness for the loads of diesel motors, i.e. at least of the magnitude of 350 to 400 HV 0.1, preferably above this. On the other hand, it has sufficient tribological properties, in particular has as low as possible an adhesive tendency compared to the tribological partner, i.e. in the case of a track coating, these do not have a tendency for local welding with the piston. Therefore, and for the adjustment of the required minimum hardness, the functional layer substantially has a martensitic proportion and austenitic proportions should be avoided as far as possible. Ferritic proportions are likewise to be avoided if possible, but can be tolerated to a small extent.

Additionally, a martensitic structure is advantageous for the functional layer for three further reasons:

The thermal expansion coefficient of martensite is clearly lower than that of austenite. Thus, the risk existing in the case of austenite that the functional layer contracts more powerfully during cooling than the substrate and is thus removed is reduced.

In the functional layer, compressive stresses result due to the martensitic conversion, which improve the connection to the substrate and additionally counteract the formation of cracks in the coating.

The thermal conductivity in the martensitic state is clearly increased compared to the austenitic structure. This leads to improved heat dissipation from the cylinder wall in the water jacket, which in turn acts favourably on the thermal component stress and the tribologic properties of the track compared to the piston/piston ring.

Experiments show that these properties occur if the following basic conditions for the alloy components of the functional layer specified in the indicators of nickel equivalent and chrome equivalent of the Schäffler diagram are fulfilled:
19−0.8CrÄ>NiÄ>CrÄ−9.

Also, herein, the evaporation of alloy components of the spray wire during the thermal coating must be included. Investigations have shown that an evaporation of up to 0.25% by weight C can occur in the spray wire. The same applies for further components of the spray wire. Thus the following basic conditions result for the spray wire to be used according to the method: 21−0.8*CrÄ>NiÄ>CrÄ−8.

An exemplary embodiment of the invention is explained in more detail below by means of a drawing.

Here is shown:

FIG. 1 the Schäffler diagram having the basic conditions for the alloy composition of a suitable functional layer.

According to this exemplary embodiment, the functional layer is deposited by means of electric arc wire spraying (EAWS). During electric arc wire spraying, two wire-shaped spray materials are supplied to a coating head. An electric arc is ignited between the wire-shaped spray materials. Here, the wire-shaped spray material melts and is targetedly applied to the substrate to be coated by means of a carrier case, where it cools, solidifies and forms the functional layer.

The wire-shaped spray material substantially comprises an iron-chrome alloy. The spray material is formed at least with carbon as a microalloy in such a way that predominantly martensite results, virtually no austenite and only small ferrite proportions.

In the parameters of the Schäffler diagram, the following composition results for the functional layer:

CrÄ=12.9 and NiÄ=5.9

The chrome equivalent thus results from a chrome proportion of 12.3% by weight and a silicon proportion of 0.38% by weight. Here, the nickel equivalent results from a nickel proportion of 0.3% by weight, a carbon proportion of 0.18% by weight and a manganese proportion of 0.4% by weight.

Further alloy components of this exemplary functional layer are Cu, Al and V, each having just under 0.1% by weight as well as small traces of P, W, Co, Mo and S.

The main component of the alloy is iron.

The quantity specifications are in percentage by weight, each with regard to a total weight, if no other specifications are made.

The functional layer according to the invention is particularly distinguished by high hardness and resistance with respect to diesel fuel having a high sulphur content of 500 to 1000 ppm, while functional layers according to prior art wear and corrode on contact with such fuel.

According to the invention, the coating of the substrate occurs by the wire-shaped spray material being melted in an electric arc and deposited on the substrate as a functional layer. The melting of the wire-shaped spray material in the electric arc preferably occurs at a melting capacity of at least 9000 W, in particular with a current of at least 250 A and/or a voltage of at least 36 V. Thus, on melting, very fine particles can be generated which in turn enable the formation of very dense layer structures.

In order to keep the suctioning of the very fine particles by the system suction as low as possible, it is advantageous to design the particle beam to be fast (high airspeed). This can occur by use of a Laval nozzle, which is described, for example, in DE 102008004607 A1.

The wire-shaped spray material 4 is advantageously supplied at a speed of a maximum of 12 m/s and the beam of melted particles is suctioned at a speed of a maximum of 20 m/s. These parameter limits ensure the formation of preferred layer structures without substantial alloy components being suctioned or evaporating.

Furthermore, it is advantageous to generate compressive stresses of the function layer by tempering in the heating oven or by local inductive heating, as this improves the adhesion of the functional layer to the substrate.

The invention claimed is:

1. A functional layer reduced in terms of frictional power and faulted as a dense coating on a substrate, the functional layer comprising an iron-based alloy having:
   a martensitic structure, and
   the following alloy components specified with the indicators of nickel equivalent (NiÄ) and chrome equivalent (CrÄ) of the Schäffler diagram:
   CrÄ>10;
   NiÄ>CrÄ−9; and
   NiÄ<19−0.8*CrÄ
   each with regard to a total weight,
   wherein
      manganese with a proportion of 0.3% by weight to 2% by weight, and/or
      silicon with a proportion of 0.01% by weight to 1% by weight, and/or
      molybdenum with a proportion of 0.01% by weight to 1% by weight, and/or
      niobium with a proportion of 0.1% by weight to 1% by weight, and/or
      titanium with a proportion of 0.001% by weight to 0.02% by weight,
   are included, each with regard to a total weight,
   wherein the functional layer is deposited on the substrate from a wire-shaped spray material melted in an electric arc at at least 9000 W and at a voltage of at least 36 volts.

2. A method for coating a substrate comprising:
   melting a wire shaped spray material in an electric arc at at least 9000 W and at a voltage of at least 36 volts; and
   depositing the melted wire shaped spray material as a dense functional layer on the substrate,
      wherein a spray wire based on iron is used, having the following alloy components specified with the indicators of nickel equivalent (NiÄ) and chrome equivalent (CrÄ) of the Schäffler diagram:
      CrÄ>10.5 and
      NiÄ>CrÄ−8 and
      NiÄ<21−0.8*CrÄ
      each with regard to a total weight,
      wherein the wire-shaped spray material additionally comprises the following alloy components:

manganese with a proportion of 0.3% by weight to 2% by weight, and/or silicon with a proportion of 0.1% by weight to 1% by weight, and/or molybdenum with a proportion of 0.01% by weight to 1% by weight, and/or niobium with a proportion of 0.01% by weight to 1% by weight, and/or titanium with a proportion of 0.001% by weight to 0.02% by weight, each with regard to a total weight.

3. The functional layer according to claim 1, wherein manganese with a proportion of from 0.3 to 0.8% by weight, and/or silicon with a proportion of from 0.2 to 0.6% by weight, and/or molybdenum with a proportion of from 0.2 to 0.6% by weight and/or niobium with a proportion of from 0.2 to 0.6% by weight, wherein the sum of the niobium and nickel proportion <1% by weight and/or titanium with a proportion of from 0.005 to 0.1% by weight, are included, each with regard to a total weight.

4. The method according to claim 2, wherein the wire-shaped spray material additionally comprises the following alloy components:

manganese with a proportion of from 0.3 to 0.8% by weight, and/or silicon with a proportion of from 0.2 to 0.6% by weight and/or molybdenum with a proportion of from 0.2 to 0.6% by weight, and/or niobium with a proportion of from 0.2 to 0.6% by weight, wherein the sum of niobium and nickel proportion <1% by weight and/or titanium with a proportion of from 0.005 to 0.01% by weight, each with regard to a total weight.

5. The functional layer according to claim 1, wherein hardness of the functional layer is greater than 350 HV 0.1.

6. The functional layer according to claim 1, wherein hardness of the functional layer is in the range of 400 to 650 HV 0.1.

7. The method according to claim 2, wherein the wire-shaped spray material is melted in the electric arc with a current of at least 250 amps.

8. The method according to claim 2, wherein the wire-shaped spray material is deposited as a beam of melted particles comprising a high airspeed particle beam.

9. The method according to claim 8, wherein the wire-shaped spray material is deposited using a Laval nozzle.

10. The method according to claim 8, wherein the beam of melted particles is suctioned at a speed of a maximum of 20 m/s.

11. The method according to claim 2, wherein the wire-shaped spray material is supplied at a speed of a maximum of 12 m/s.

12. The method according to claim 2, wherein hardness of the functional layer deposited on the substrate is greater than 350 HV 0.1.

13. The method according to claim 2, wherein hardness of the functional layer deposited on the substrate is in the range of 400 to 650 HV 0.1.

14. The method according to claim 2, further comprising improving adhesion of the functional layer sprayed on the substrate by generating compressive stresses of the functional layer by tempering the functional layer in a heating oven by local inductive heating of the functional layer.

15. The functional layer according to claim 1, wherein the wire-shaped spray material is melted in the electric arc with a current of at least 250 amps.

16. The functional layer according to claim 1, wherein the wire-shaped spray material is deposited as the functional layer on the substrate as a beam of melted particles comprising a high airspeed particle beam.

17. The functional layer according to claim 16, wherein the wire-shaped spray material is deposited as the functional layer on the substrate using a Laval nozzle, wherein the beam of melted particles is suctioned at a speed of a maximum of 20 m/s and supplied at a speed of a maximum of 12 m/s.

* * * * *